Figure 1:
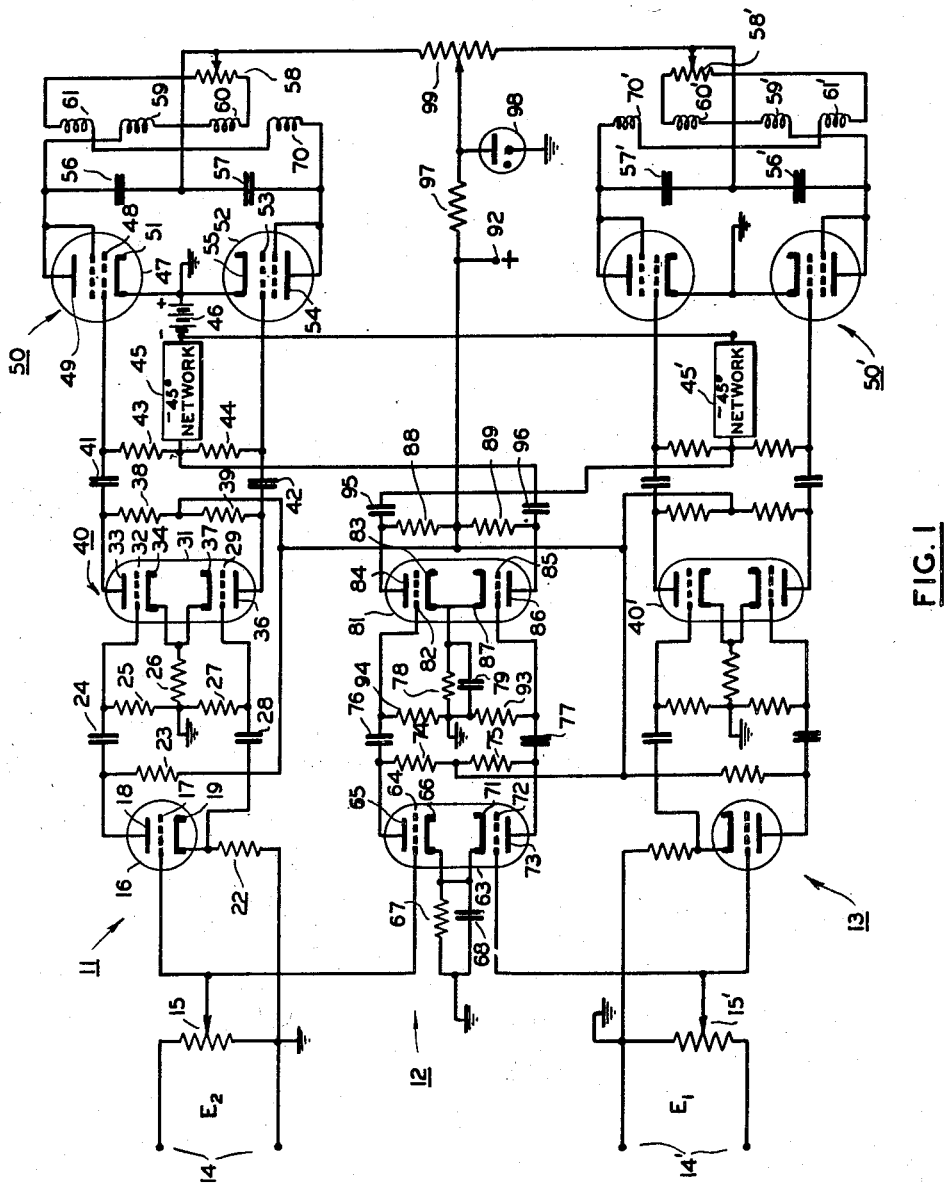

Dec. 3, 1946. W. W. HANSEN 2,411,876
PHASE ANGLE INDICATOR
Filed Sept. 6, 1943 2 Sheets-Sheet 1

INVENTOR
WILLIAM W. HANSEN
BY Paul B. Hunter
ATTORNEY

Dec. 3, 1946.   W. W. HANSEN   2,411,876
PHASE ANGLE INDICATOR
Filed Sept. 6, 1943   2 Sheets-Sheet 2

INVENTOR
WILLIAM W. HANSEN
BY
ATTORNEY

Patented Dec. 3, 1946

2,411,876

UNITED STATES PATENT OFFICE 2,411,876

PHASE ANGLE INDICATOR

William W. Hansen, Garden City, N. Y., assignor to Sperry Gyroscope Company, Inc., a corporation of New York Application September 6, 1943, Serial No. 501,371

10 Claims. (Cl. 172—245)

My invention relates to electrical measuring devices in general, and more particularly to apparatus and methods for measuring the phase relationship of two alternating or periodically varying quantities.

Present methods employed for phase angle determination use apparatus which falls within one of three classes, or types. The more familiar balanced circuit and moving coil types have been followed by what may be classified generally as the electronic type, within which the instant invention falls.

An object of my invention is to provide electronic phase measuring apparatus which is not subject to the effect of noise.

Another object of my invention is to provide a method and apparatus for measuring the phase difference between two periodically varying quantities which may or may not be of equal amplitude.

A further object of my invention is to provide apparatus for measuring phase which is capable of giving a linear indication through a full 360° of phase difference.

A further purpose of my invention is to provide apparatus for determining the phase relations between two periodically varying quantities in which no moving parts of the apparatus carry currents of the quantities whose phase relationship is to be determined.

Yet another purpose of my invention is to provide a method and apparatus for measuring the phase angle existing between two periodically varying electrical quantities in which two direct currents, whose ratio is proportional to a function of the phase angle existing between the quantities, are used to establish two electrical fields at right angles to each other, said electrical fields producing a resultant field the direction of which is used to determine phase.

A still further object of my invention is to provide a phase meter of the electronic type in which two cross-connected channels are employed to modulate each of two alternating electrical quantities with the inputs of the respective opposite channels whose phases have been shifted through a fixed and predetermined angle, and in which the direct current components of the respective modulated currents so produced are used to establish a vector force whose angle, with respect to a reference line fixed in space, is equal to the phase difference between the two alternating electrical quantities.

It is also a purpose of my invention to provide a circuit having two separate channels, arranged in symmetry about a cross-connecting network, in which two alternating electrical quantities are used to produce a like number of non-alternating electrical forces for transmission through means capable of producing a series of electrical fields which cause an electrodynamic indicator to align itself with respect to a reference at an angle equal to the phase difference between the two alternating quantities.

Other objects of my invention will become apparent and those listed more evident as the description proceeds.

In carrying out my invention, in a preferred embodiment thereof, I arrange two circuit channels in symmetry about a dual channel cross-connecting network, each of which has input terminals for receiving respectively one of the two periodically varying electrical quantities whose phase angle relation is to be determined. The channels are identical, and each comprises a voltage divider, a phase inverter, a push-pull amplifier, and a balanced modulator in whose common grid circuit is connected a phase shifting network.

The dual channel cross-connecting network, made up of two amplifiers, and two combination impedance matching and amplifying elements, performs the function of supplying the phase shifting network of each channel with a part of the electrical quantity impressed upon its respective opposite channel.

With the circuit arranged thus, each of the two electrical quantities modulates a portion of the other whose phase has been shifted through —45° angle. The direct current components of the respective modulated quantities, whose ratio is proportional to a function of the angle of phase difference between them, are then passed through two sets of coils disposed at right angles with each other. The flow of current through these coils establishes two electrical fields, which are also at right angles with each other. The direction of the resultant electrical field is equal to the phase difference between the two electrical quantities, and as determined by an electrodynamic indicator gives measurement thereof.

Figure 2:
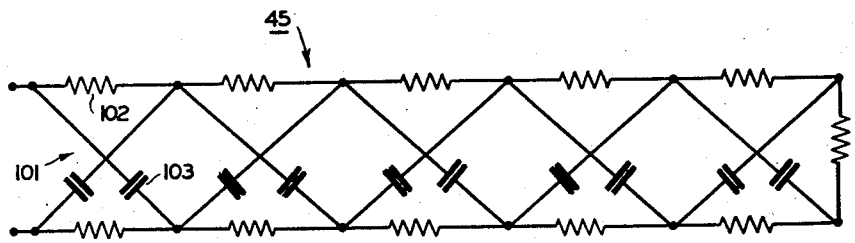
Figure 3:
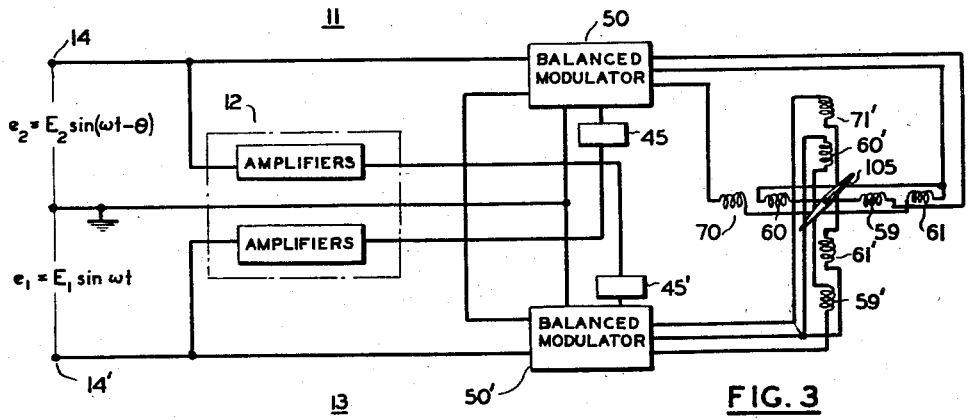
Figure 4:
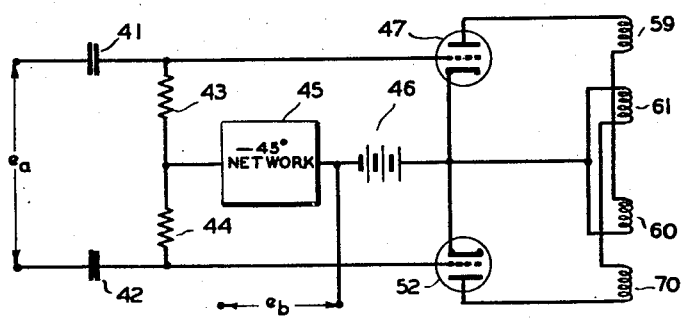

A more comprehensive understanding of my invention will be afforded from the following detailed description, when taken together with the accompanying drawings of which Fig. 1 is a circuit diagram of an embodiment of my invention;

Fig. 2 a detail of the 45° network appearing in the circuit shown in Fig. 1;

Fig. 3 a modified block diagram of the circuit shown in Fig. 1;

Fig. 4 a modified showing of the balanced modulators in Fig. 1; and

Figure 5:
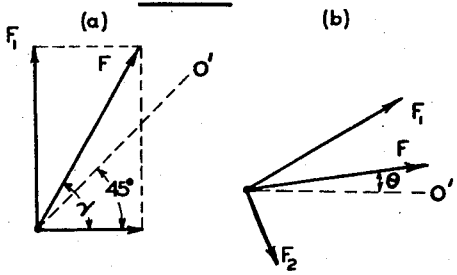

Fig. 5 a vector diagram of the forces which result from the coil arrangement shown in Fig. 3.

Like reference numerals have been used throughout in the drawings to designate like parts.

In the circuit diagramed in Fig. 1, illustrating an embodiment of my invention, two channels 11 and 13, interconnected by a cross-connecting network 12, are employed in a manner which will be explained with reference to Fig. 3. Two periodically varying electric quantities $E_2$ and $E_1$, the phase relationship between which is to be determined, are impressed respectively upon input terminals 14 and 14' of the channels 11 and 13.

Upon the input terminals 14 of channel 11 is impressed one of the two periodically varying electrical quantities $E_2$ where it is divided for delivery to the balanced modulator 50, and to the upper half of the dual channel cross-connecting network 12. Here it is amplified and then transmitted through the phase shifting network 45' to balanced modulator 50'. In like manner the quantity $E_1$ is taken from input terminals 14' for delivery to the balanced modulator 50', and a portion thereof to the lower half of cross-connecting network 12, which delivers it to the phase shifting network 45 associated with balanced modulator 50. Within the balanced modulator 50, quantity $E_2$ is used to modulate the quantity $E_1$ whose phase has been shifted through −45° and, similarly, in balanced modulator 50' the quantity $E_1$ modulates that part of $E_2$ whose phase has been shifted through 45°.

The outputs of balanced modulators 50 and 50' are passed through coils 59, 60, 61 and 70 and 59', 60', 61' and 70' respectively. As shown in Fig. 3, the coils 59, 60, 61 and 70 are disposed at right angles to the coils 59', 60', 61' and 70'. Within these coils are generated two electrical fields which cause the electrodynamic indicator 105, shown in Fig. 3, to align itself with respect to a reference in such manner that the angle $\theta$ (Fig. 5) representing the phase difference between $E_1$ and $E_2$ is measured.

Since both channels of the circuit are identically connected, only one will be explained and only such elements of the other as are necessary to the description will be referred to.

As shown in Fig. 1, the voltage $E_2$ is taken from the terminals 14 to potentiometer 15, from which point it is conducted to cross-connection network 12 and also through channel 11. That portion of $E_2$ which passes through the channel is delivered to a phase inverter 16, illustrated as a triode, where it is received by its control grid 17. Anode 18, and cathode 19 of this element are connected to positive energy source 92 and ground respectively through plate resistor 23 and cathode resistor 22. The output of stage 16 is taken from its anode and cathode for delivery to a push-pull amplifier 40, comprising in part the electronic discharge element 31.

This device, which may take the form of a twin triode, is coupled in the conventional manner for push-pull amplication. Its control grids 32 and 29 are coupled to the anode and cathode of tube 16 respectively through capacitors 24 and 28. Cathodes 34 and 37 are connected to ground through resistor 26. Grid leak resistors 25 and 27 are provided for grids 32 and 29 respectively. Plates 33 and 36 receive positive energy from source 92 through plate resistors 38 and 39 and deliver the output of amplifying stage 40 to a balanced modulator 50, through capacitors 41 and 42.

Balanced modulator 50 comprises two electronic discharge elements 47 and 52 which are connected in the usual manner, with the exception of a phase shifting network 45 in the common grid circuit. This network, shown in detail in Figure 2, is made up of lattice sections 101 the arms of which comprise the pure resistances, 102 and capacitances, 103. It receives the output of the lower half of cross-connecting network 12, as will be explained later, and shifts the phase thereof through −45°.

Control grid 48 of element 47 and 53 of element 52 receive the output of amplifier 40 as explained above. Cathodes 51 and 55 of these tubes, shown as tetrodes and connected as triodes, are tied together and directly connected to ground, while grid leak resistors 43 and 44 are connected in the grid circuits of the respective tubes.

Negative bias is supplied to grids 48 and 53 and to the corresponding grids of the tubes in balanced modulator 50' of channel 13 from energy source 46, in order that the tubes may be made to operate on the curved portion of their plate characteristic curve where the plate current is approximately equal to the square of the voltage. Plates 49 and 54 are connected in series through coils 59, 60, 61 and 70 and the winding of potentiometer 58, whose movable arm is connected to the winding of potentiometer 99. By-pass condensers 56 and 57, in series with each other, are coupled in parallel with the coils 59, 60, 61 and 70.

As stated before, the voltage which is to be modulated is supplied to the balanced modulator of each channel from the input of the channel opposite to it. Thus a part of $E_2$ is taken from potentiometer 15 and impressed upon the control grid 64 of element 63 in cross-connecting network 12.

Here the upper halves of elements 63 and 81 acts as amplifiers for supplying the voltage $E_2$ to phase shifting network 45' in channel 13, each stage of amplification producing 180° of phase shift. The lower halves perform like functions for supplying the voltage $E_1$ to network 45 in channel 11. For one frequency, element 81 may act as an impedance matching device, this being necessary only if the impedance level of the phase shifting networks 45 or 45' is low. In any case, however, its primary function is that of amplification.

The phase shifting networks 45 and 45', connected in the common grid circuit of the balanced modulator of each channel, form a part of the load impedance of the twin triode 81.

Grids 64 and 72 of element 63 are connected to receive the voltages $E_2$ and $E_1$, respectively, and anodes 65 and 73 to receive positive energy from source 92 through plate resistors 74 and 75. Cathodes 66 and 71 are tied together and grounded through resistor 67, which has a by-pass condenser 68 coupled in parallel therewith. The output of plate 65 is delivered to grid 82 of element 81 through coupling condenser 76 and similarly plate 73 is coupled to grid 85 through capacitor 77. A common cathode circuit comprising cathode resistor 78 and by-passing condenser 79 connects the cathodes 83 and 87 to ground and resistors 94 and 93 provide a direct current return path for grids 82 and 85 respectively.

Plates 84 and 86 receive positive energy from source 92 through plate resistors 88 and 89 and deliver the voltages $E_2$ and $E_1$ through coupling condensers 95 and 96 to the phase shifting networks 45' and 45 respectively.

A circuit balancing branch for the two balanced modulators 50 and 50' comprising resistor 97, voltage regulator 98 and potentiometer 99, balances the operation of these elements by controlling the plate voltage delivered to their respective tubes, from source 92.

In operation the phase inverter and push-pull amplifier of each channel function normally. Likewise the amplifiers of the cross-connecting network 12 operate in the usual manner, making unnecessary a detailed explanation of the operation of the circuit up to the point where each of the impressed voltages $E_2$ and $E_1$ is modulated.

Considering the modified circuit diagram shown in Fig. 3, the voltage $E_2$ is received by balanced modulator 50 where it modulates a part of $E_1$ whose phase has been shifted through $-45°$ by phase shifting network 45. Similarly voltage $E_1$ modulates a part of $E_2$ whose phase has been shifted through a like angle by network 45'.

Networks 45 and 45' are made up of cascaded lattice sections, as shown in Figure 2, and simulate ideal infinite cables. The characteristic impedance of each network varies inversely as the square root of the frequency of the impressed voltage at an angle of $-45°$, which is independent of frequency.

Assuming the balanced modulator circuits of each channel to be symmetrical and the tubes thereof to be operating in accordance with the square law, their operation will be described accordingly and by specific reference to only one of them.

Balanced modulator 50 of channel 11, will be considered for purposes of explanation as shown in Fig. 4. Assuming the two voltages $E_1$ and $E_2$ to be varying sinusoidally and to differ in phase by $\theta$ degrees, then the instantaneous value of $E_1$ and $E_2$ may be expressed as:

(1) $\qquad e_1 = E_1 \sin \omega t$
(2) $\qquad e_2 = E_2 \sin (\omega t - \theta)$ Using the series expansion for electrode currents, the plate current $i_1$ flowing in coils 59 and 60 may be expressed as (3) $\quad i_1 = a_1(e_a + e_b) + a_2(e_a + e_b)^2 + a_3(e_a + e_b)^3 + \ldots$ and the plate current $i_2$ flowing in coil 61 and 70 as (4) $\quad i_2 = a_1(e_a - e_b) + a_2(e_a - e_b)^2 + a_3(e_a - e_b)^3 + \ldots$ where the $(a)$s are constants, the value of each depending upon tube characteristics and external circuits, and $e_a$ and $e_b$ the instantaneous voltages appearing as signal and carrier voltages respectively on the input terminals of the balanced modulator 50.

Here the voltage $e_a$ equals $e_2$, or (5) $\qquad e_a = E_2 \sin (\omega t - \theta)$, and
(6) $\qquad e_b = E_1 \sin (\omega t - 45°)$ which is $e_1$ shifted in phase by a $-45°$, due to the action of network 45.

The resultant current $i_0$ flowing through coils 59, 60, 61 and 70 is equal to the algebraic sum of $i_1$ and $i_2$, or (7) $\qquad i_0 = i_1 - i_2$ which in terms of Equations 3 and 4 may be expressed as (8) $\quad i_0 = 2[a_1 e_b + 2a_2 e_a e_b + a_3(3e_a^2 e_b + e_b^3) + \ldots]$ Assuming the tubes 47 and 52 to have similar characteristics and equal external load resistances, all components higher than the second order may be neglected, and (9) $\qquad i_0 = 2[a_1 e_b + 2a_2 e_a e_b]$ By substituting the values of $e_a$ and $e_b$ given by Equations 5 and 6 in Equation 9 we have

(10) $\quad i_0 = 2E_1 \sin (\omega t - 45°)[a_1 + 2a_2 E_2 \sin (\omega t \theta)]$ which may be expanded and put in the form

(11) $\quad i_0 = 2a_1 E_1 \sin (\omega t - 45°) + 2a_2 E_1 E_2 \cos (\theta - 45°) - 2a_2 E_1 E_2 \cos (2\omega t - \theta - 45°)$ Since the alternating current components of $i_0$ are by-passed by condensers 56 and 57 (Fig. 1), the direct current $i_{1dc}$ flowing in coils 59, 60, 61 and 70, as defined by the second term of Equation 11, is $\qquad i_{1dc} = 2a_2 E_1 E_2 \cos (\theta - 45°)$, or
(12) $\qquad = 2a_2 E_1 E_2 \sin (\theta + 45°)$ A similar analysis of the operation of balanced modulator 50' in channel 13 will give a value for the direct current $i_{2dc}$ flowing in coils 59', 60', 61' and 70', which may be expressed as

(13) $\qquad i_{2dc} = 2a_2 E_1 E_2 \cos (\theta + 45°)$ if the instantaneous value of voltages $e_a$ and $e_b$ expressed as

(14) $\qquad e_a = E_1 \sin \omega t$, and
(15) $\qquad e_b = E_2 \sin (\omega t - \theta - 45°)$ be substituted in Equation 10.

Thus it is seen that two currents, whose ratio is proportional to a function of the angle $\theta$ expressing the phase difference between the voltage $E_1$ and $E_2$, are passed respectively through the coils of each channel. Now, if these coils be arranged at right angles with each other as shown in Fig. 3, two electrical fields will be produced by the flow of currents $i_{1dc}$ and $i_{2dc}$ which are also at right angles.

These electrical fields will in turn produce deflecting forces $F_1$ and $F_2$, at 90° with each other, as shown in Fig. 5(a), due respectively to $i_{1dc}$ and $i_{2dc}$, and the resultant F of forces $F_1$ and $F_2$, at an angle $\gamma$, may be expressed as

(16) $\quad F\lfloor \gamma = \overline{F_1} + \overline{F_2} = \sqrt{(ki_{1dc})^2 + (ki_{2dc})^2} \lfloor \tan^{-1} \dfrac{i_{1dc}}{i_{2dc}}$ $\qquad = kE_1 E_2 \lfloor \tan + \tan (\theta + 45°)$ $\qquad = kE_1 E_2 \lfloor \theta + 45°$ Therefore if the angular deflection is measured from the 45° position O' as shown in Fig. 5(b) then

(17) $\qquad F\lfloor \beta = kE_1 E_2 \lfloor \theta$ which may be termed the phase meter equation.

With the two sets of coils 59, 60, 61 and 70 and 59', 60', 61' and 70' arranged as shown in Fig. 3, a magnetic needle 105, pivoted to align itself in the direction of the resultant force F, is used to give an indication of the phase angle $\theta$. Or, if the effect of the earth's field is to be eliminated, the direct currents $i_{1dc}$ and $i_{2dc}$ may be passed through two movable coils arranged at right angles with each other in a permanent magnetic field.

The coil arrangement illustrated as comprising two sets of coils each of which is made up of two pairs with one coil of each pair located on opposite sides of the electrodynamic indicator 105, is necessary to establish continuous fields. Since the elements of modulator 50 act as class B amplifiers, current flows in the plate circuit of each tube for only one-half cycle and the coil which is connected in the plate circuit of the respective tubes must be divided for full cycle operation.

Examination of Equation 17 shows that it is possible for needle 105 to pass through a full 360° as $\theta$ varies a corresponding amount, thus giving a linear indication throughout the entire range of 360°, and making calibration of the instrument extremely simple.

Since phase reversals of the periodically varying quantities are not used in any manner, the apparatus is free from the effects of noise and is accordingly highly accurate.

Modifications of my invention are of course possible and may suggest themselves in view of the foregoing disclosure. It is therefore intended that all matter contained in the above description or shown in the accompanying drawings shall be considered as being illustrative, and that the spirit and scope of my invention be regarded as of such breadth as is defined by the appended claims.

What is claimed is:

1. Apparatus for determining the phase relationship between two periodically varying electrical quantities comprising separate means for modulating a portion of each of said electrical quantities whose phase has been shifted through a predetermined angle with a portion of the other periodically varying electrical quantity whose phase is unshifted, and means responsive to the direct current components of the two modulated electrical quantities thus produced for giving an indication of the phase difference between the two quantities.

2. In an electronic phase meter, a first balanced modulator including phase shifting means for modulating a first of two periodically varying electrical quantities with the second of said quantities after the latter has been shifted in phase through a predetermined angle, a second balanced modulator including phase shifting means for modulating the second periodically varying electrical quantity with the first quantity after its phase has been shifted through a predetermined angle, and indicating means responsive to the outputs of said first and second balanced modulators.

3. In an electronic phase meter, a circuit having two pairs of input terminals each of which receive one of two periodically varying electrical quantities, a first balanced modulator including phase shifting means for modulating the first of said quantities with the second after the latter's phase has been shifted through a predetermined angle, a second balanced modulator including phase shifting means for modulating the second of said periodically varying electrical quantities with the first after the latter has been shifted in phase through a predetermined angle, coil means for receiving the output of said first balanced modulator, coil means disposed at an angle to said first coil means for receiving the output of said second balanced modulator, and electrodynamic indicating means responsive to electrical fields established in said coil means.

4. In apparatus for measuring the phase relationship between two periodically varying electrical quantities, the combination comprising a first and second balanced modulator having phase shifting networks connected in the respective grid circuits thereof, means for applying one of said electrical quantities directly to said first balanced modulator and to the phase shifting network associated with said second balanced modulator, means for applying the other of said electrical quantities directly to said second balanced modulator and to the phase shifting network associated with said first balanced modulator, means for creating a first electrical field from the output of said first balanced modulator, means for creating a second electrical field transverse to the first from the output of said second balanced modulator, and means for measuring the resultant electrical field produced with respect to a reference.

5. An electronic circuit comprising a first balanced modulator having input terminals for receiving a first of two periodically varying electrical quantities differing in phase from each other by an angle $\theta$, phase shifting means within said first balanced modulator for receiving a portion of the second of said periodically varying electrical quantities, a second balanced modulator having input terminals for receiving the second of said periodically varying electrical quantities, phase shifting means within said second balanced modulator for receiving a portion of the first of said periodically varying electrical quantities, and indicating means for receiving the output of said first and second balanced modulators to give an indication of the angle $\theta$.

6. A phase angle meter comprising two cross-connected channels arranged in a symmetrical circuit, each channel having a pair of input terminals for receiving one of two periodically varying electrical quantities whose phase relationship is to be determined, a voltage divider for passing a part of each of said electrical quantities into the opposite channel, means for shifting the phase of each part so passed through a fixed and predetermined angle, means within each channel to modulate the quantity from the opposite channel whose phase has been shifted with said electrical quantity appearing on its input terminals, means within each channel for separating out the direct current component of said modulated quantity, means for receiving direct current components of the output of each channel to produce two electrical fields at right angles with each other, and means for indicating the direction of the resultant field produced by said electrical fields to give an indication of phase angle.

7. In an electronic phase meter, a symmetrical circuit comprising two channels, arranged in symmetry about a cross-connecting network, having a pair of input terminals for each channel, means within each channel for modulating a periodically varying electrical quantity appearing on the input terminals of the opposite channel which has been shifted in phase through a fixed and predetermined angle, with the periodically varying quantity received on its input terminals, means for utilizing the direct current components of the modulated output of the respective channels to produce two electrical fields at right angles with each other, and means for indicating the direction of the resultant field with respect to a reference to indicate the phase angle relationship between the two periodically varying electrical quantities.

8. In an electronic phase meter, two symmetrical channels arranged about a cross-connecting network interconnecting said symmetrical channels, each of said channels having input means for receiving one of two periodically varying electrical quantities, means for diverting a part of each of said electrical quantities into the opposite channel through said cross-connecting network, separate amplifying and impedance matching means within said cross-connecting network for operating upon each of said diverted electrical quantities, phase inverting means within each channel for inverting the phase of the electrical quantity received by said channel, a push-pull amplifying means for receiving the output of each of said phase inverting means, a balanced modulator within each channel having signal input terminals for receiving the respective outputs of each of said push-pull amplifying means, and input terminals for receiving a carrier quantity from said cross-connecting network, means within each of said balanced modulators for shifting the phase of said carrier quantity, and means for receiving the output of each of said balanced modulators to give an indication of phase angle.

9. A method for determining the phase relation between two periodically varying electrical quantities, comprising the steps of shifting the phase of each quantity through a fixed and predetermined angle, modulating each electrical quantity whose phase is shifted with the other quantity, separating the direct current components out of the modulated quantities produced by the previous step, producing two electrical fields at right angles with each other from the said direct current components, and measuring the resultant field so produced to give a phase angle measurement.

10. In an electronic phase meter, a first balanced modulator including phase shifting means for modulating a first of two periodically varying electrical quantities with the second of said quantities after the latter has been shifted in phase through a predetermined angle, a second balanced modulator including phase shifting means for modulating the second periodically varying quantity with the first quantity after its phase has been shifted through the same predetermined angle, and indicating means responsive to the outputs of said first and second balanced modulators.

WILLIAM W. HANSEN.